(12) United States Patent
Noya et al.

(10) Patent No.: US 6,851,023 B2
(45) Date of Patent: Feb. 1, 2005

(54) METHOD AND SYSTEM FOR CONFIGURING RAID SUBSYSTEMS WITH BLOCK I/O COMMANDS AND BLOCK I/O PATH

(75) Inventors: Eric S. Noya, Groton, MA (US); Jeffrey T. Wong, Newton, MA (US); Chris R. Franklin, Merrimack, NH (US); Randy M. Arnott, Mont Vernon, NY (US)

(73) Assignee: Raidcore, Inc., Nashua, NH (US)

(*) Notice: Subject to any disclaimer, the term of this patent is extended or adjusted under 35 U.S.C. 154(b) by 0 days.

(21) Appl. No.: 10/045,408

(22) Filed: Jan. 14, 2002

(65) Prior Publication Data

US 2003/0135692 A1 Jul. 17, 2003

(51) Int. Cl.[7] ............................................. G06F 13/00
(52) U.S. Cl. ......................... 711/114; 711/112; 711/170
(58) Field of Search ................................ 711/112, 114, 711/170

(56) References Cited

U.S. PATENT DOCUMENTS

| | | | |
|---|---|---|---|
| 5,081,577 A | 1/1992 | Hatle | 364/200 |
| 5,566,331 A * | 10/1996 | Irwin et al. | 707/10 |
| 5,758,187 A * | 5/1998 | Young | 710/24 |
| 5,867,736 A | 2/1999 | Jantz | 395/894 |
| 5,930,817 A | 7/1999 | Mizuno et al. | 711/114 |
| 6,263,382 B1 | 7/2001 | Bartlett et al. | 710/10 |
| 6,289,398 B1 * | 9/2001 | Stallmo et al. | 710/5 |

* cited by examiner

Primary Examiner—Reba I. Elmore
(74) Attorney, Agent, or Firm—Sterne Kessler Goldstein & Fox P.L.L.C.

(57) ABSTRACT

A configurable RAID subsystem includes a user data array connected to a user application via a block I/O path, and a configuration array connected to a configuration application via the same block I/O path. The user data array processes user data access commands executed by the user application; and the configuration application processes configuration commands, the user data access commands and the configuration commands communicated to the user data array and the configuration array respectively, via the block I/O path. A dynamic identification is assigned to the user data array by the configuration array, and a static identification is assigned to the configuration array.

18 Claims, 8 Drawing Sheets

PRIOR ART

*FIG. 1*

PRIOR ART

*FIG. 2*

PRIOR ART

METHOD AND SYSTEM FOR CONFIGURING RAID SUBSYSTEMS WITH BLOCK I/O COMMANDS AND BLOCK I/O PATH

FIELD OF THE INVENTION

This invention relates generally to the field of disk storage subsystems, and more particularly to configuring redundant arrays of independent disks (RAID) subsystems.

BACKGROUND OF THE INVENTION

Most modem, mid-range to high-end disk storage subsystems are arranged as redundant arrays of independent disks (RAID). A number of RAID levels are known. RAID-1 includes sets of N data disk drives and N mirror disk drives for storing copies of the data disk drives. RAID-3 includes sets of N data disk drives and one parity disk. RAID-4 also includes sets of N+1 disk drives. RAID-5 distributes parity data across all disk drives in each set of N+1 disk drives.

A RAID subsystem must be configurable. That is, the arrays, which perform I/O operations for users, must be created, managed, and deleted. Many other functions of the RAID subsystem must also be performed, such as on-line expansion, RAID level migration, and assigning spare space. A configuration description of the arrays must also be readable, and configuration applications must be able to monitor the arrays during operation. For that reason, a configuration interface and module are included with all RAID subsystems.

Figure 1:
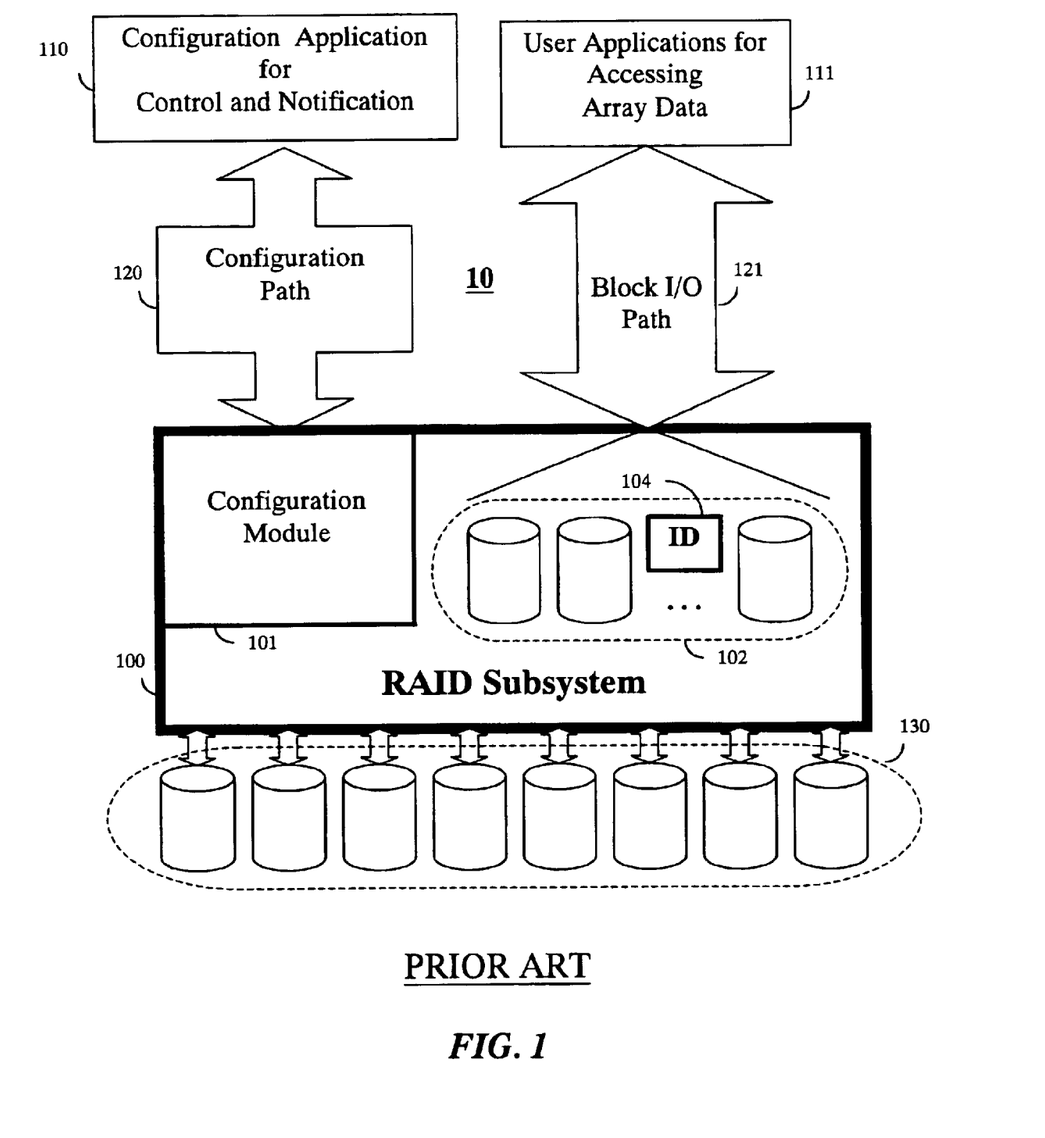
FIG. 1 is a block diagram of a prior art RAID subsystem with a block I/O path and a specialized configuration path.

FIG. 1 shows components of a computer system 10 including a typical prior art RAID subsystem 100. The RAID subsystem 100 includes a RAID configuration module 101, and one or more RAID user data arrays 102 each with their own array Identification (ID) 104. User applications 111 use a block I/O path 121 to read and write, generally "access," user data of the RAID arrays 102 using the ID 104 assigned to each array. Physically, the RAID arrays 102 store the user data on block storage devices 130.

The problem with the prior art RAID subsystems is that a configuration application 110 must use a specialized configuration path 120 to communicate with the configuration module 101 to perform the configuration functions described above.

Figure 2:
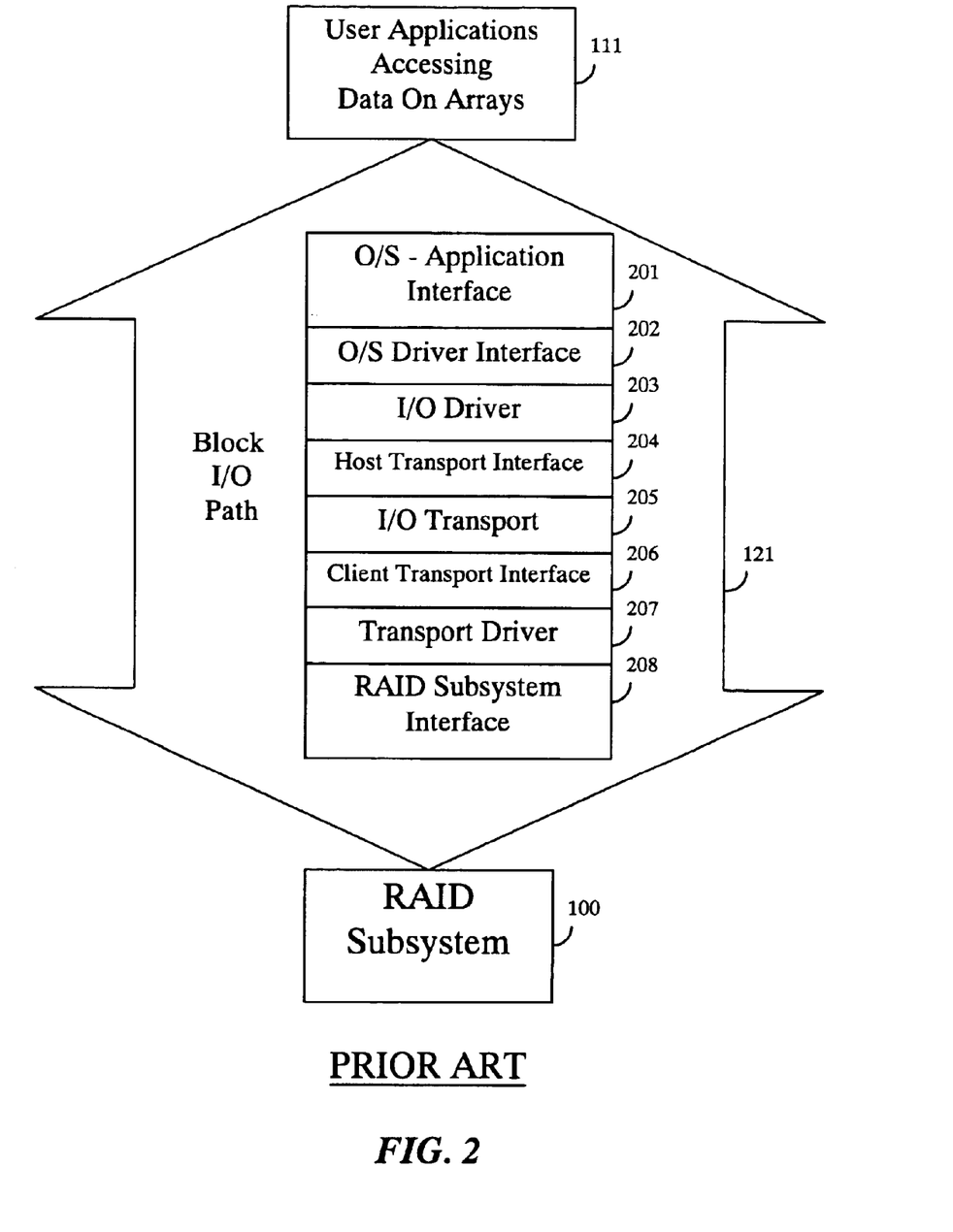
FIG. 2 is a block diagram of the layers of the block I/O path of FIG. 1.

FIG. 2 shows the layers of the block I/O path or calling stack 121 used for user data transfer. The software and hardware of the block I/O path 121 includes, from the top host side to the bottom client side, an operating system (O/S)—application interface 201, an O/S driver interface 202, an I/O driver 203, a host transport interface 204, an I/O transport 205, a client or external transport interface 206, a transport driver 207, and a RAID subsystem interface 208.

The interface 201 translates I/O requests executed by the user applications 111 for the O/S driver interface 202. The I/O driver 203 translates specific O/S calls for the transport layer 205, such as PCI, iSCSI, Infiniband, SCSI, or fibre-optic channel, or some other high bandwidth bus. The transport driver 207 communicates with the RAID subsystem interface 208, which in turn communicates with the RAID subsystem 100.

The block I/O path 121 is relatively straightforward because most operating systems and buses use the same basic functions. Only minor differences are found among operating system interfaces. Typically, most of the layers of the stack that form the block I/O path 121 are well defined.

The O/S—application interface 201, the O/S driver interface 202, transport interfaces and transport 204–206 are typically standardized. Some of the drivers and interfaces may be specialized or proprietary. For instance, most RAID subsystems require a specially designed I/O driver 203, transport driver 207, and RAID subsystem interface 208.

Figure 3:
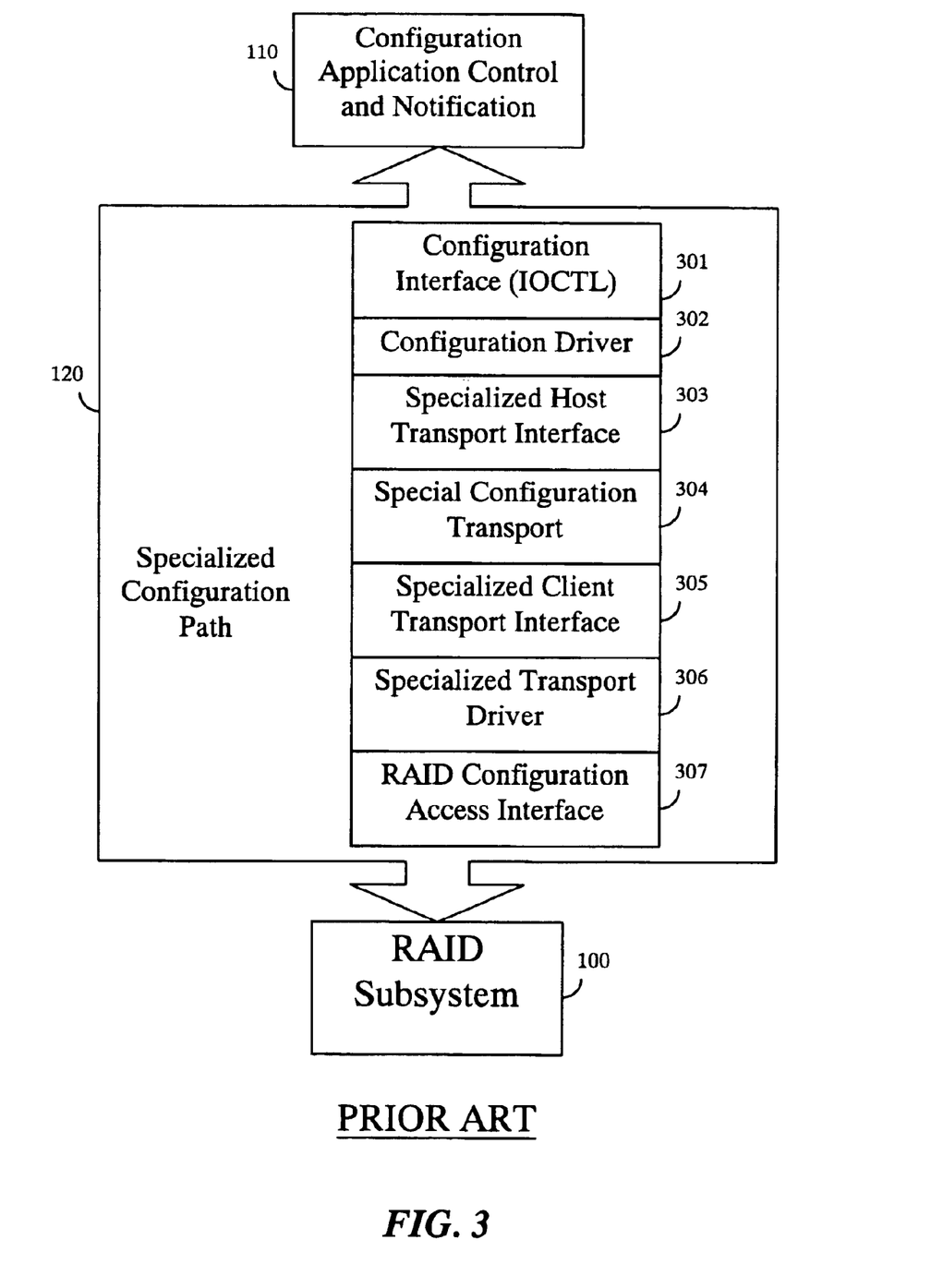
FIG. 3 is a block diagram of the layers of the specialized configuration path of FIG. 1.

However as shown in FIG. 3, the layers of the stack that form the configuration path 120 generally have far more specialized components than the block I/O path. A configuration interface 301 to the configuration application 110 is typically a proprietary set of IOCTLs (I/O control commands) that need to be designed and defined. A configuration driver 302 implements these specialized IOCTLs to allow control of the RAID subsystem 100. The transport layers 303–305, which also can use SCSI, fibre, or PCI buses, have specialized block I/O commands, and usually the specialized transport interface 303 is customized. For SCSI buses, for instance, the transport interface 303 uses mode pages with devices. In fact, many RAID subsystems even include a separate third physical path, such as Ethernet, or serial ports to implement the transport layers 303–305. The driver or external side transport interface 305 also uses specialized primitives that communicate with a specialized transport driver 306, and of course a specialized RAID configuration interface 307.

In all RAID subsystems, the configuration interface 301, configuration driver 302, host side configuration transport interface 303, client side configuration transport interface 305, transport driver 306 and RAID configuration interface 307 are specialized. Additionally, many RAID subsystems even have a specialized configuration transport 304.

Therefore, current RAID subsystems have a severe problem. The configuration portions perform many functions, yet these are not pre-defined. Every operating system requires a re-implementation of the configuration functions and interfaces, and every configuration application needs specialized software, and perhaps, access to specialized hardware. This increases the cost and complexity of the computer system 10.

Even if the configuration stack 120 were as easy to implement as the block I/O stack 121, it is still requires a completely separate implementation to communicate with the configuration module 101. A lot of effort is required to make this possible. In addition, the configuration path 120 often has many limitations with respect to the number of commands and the amount of information that it can process.

Therefore, there is a need for a RAID subsystem that does not require a specialized configuration path so that the cost and complexity of the entire computer system can be reduced.

SUMMARY OF THE INVENTION

The invention provides a RAID subsystem that uses only a block I/O path for accessing both RAID user data arrays and a configuration array. A configuration application uses the same block I/O path as the user application to issue commands to a configuration array, and to receive data and status in response to these commands.

In fact, to the configuration application, the configuration array appears as just another RAID array. The configuration array is distinguishable from a user array only by its associated configuration array identification (ID). The configuration array ID enables the configuration application to locate the configuration array on the RAID subsystem.

Unlike the user data array, the configuration array does not store user data. Instead, the configuration array receives configuration commands, processes these commands, and supplies the configuration application with configuration information in response to the configuration commands. The configuration array ID is accessed with block I/O commands, and uses block I/O data.

More particularly, a configurable RAID subsystem includes a user data array connected to a user application via a block I/O path, and a configuration array connected to a configuration application via the same block I/O path.

The user data array processes user data access commands executed by the user application, and the configuration array processes configuration commands. The user data access commands and the configuration commands are communicated to the user data array and the configuration array respectively, via the block I/O path.

A dynamic identification is assigned to the user data array by the configuration array, and a static identification is assigned to the configuration array.

DETAILED DESCRIPTION OF THE PREFERRED EMBODIMENTS

System Structure

Figure 4:
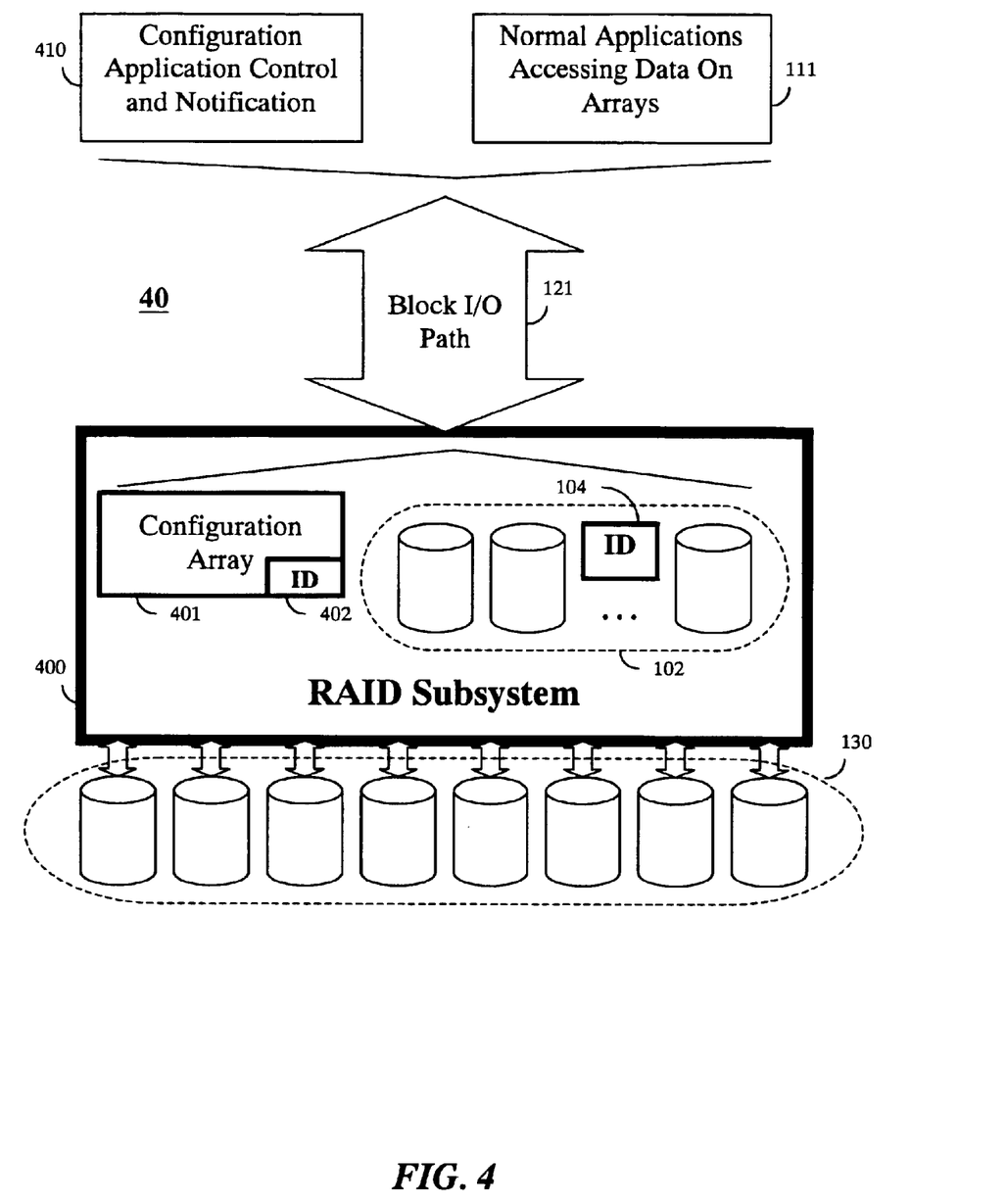
FIG. 4 is a block diagram of a RAID subsystem including a configuration array according to the invention.

FIG. 4 shows a computer system 40 including a RAID subsystem 400 according to the invention. The RAID subsystem 400 includes one or more user data arrays 102. A user application 111 accesses the user data arrays 102 via a block I/O path 121, and the arrays 102 process all block I/O commands received via the block I/O path 121 from the user application 111. The RAID subsystem 400 uses block devices 130, for example, disk drives, to physically store user data.

The RAID subsystem 400 according to the invention also includes a configuration array 401. A configuration application 410 also uses the block I/O path 121 to access the configuration array 401. In the RAID subsystem 400 according to the invention, the configuration array 401 appears just like any of the user arrays 102, except for its predetermined and static configuration identification 402.

Each array 102 exported by the RAID subsystem 400 also has an associated user identification 104. The dynamic user identifications 104 of the user arrays 102 are part of the configuration information assigned and provided by the configuration array 401 that has the static configuration ID 402. The identifications can be stored in a memory of the RAID subsystem 400.

With this arrangement, only one set of drivers needs to be implemented for the application 410 and 111, because all communications with the RAID subsystem 400 are via the single block I/O path 121. That is, the configuration application 410 according to the invention uses the same call stack 121 as the user application 111.

However, the configuration array 401 has a static identification 402, while the user arrays 102 have dynamic identifications 104 that are assigned when the arrays are created by the configuration application 410.

Because the block I/O path usually includes a hardware network such as Ethernet, or buses such as iSCSI, SCSI, and fibre-optic, the configuration application 410 only needs to include primitive I/O command processing for the operating system on which it executes, regardless of whether the RAID subsystem 400 is local or external to the computer system.

For an external RAID subsystem, the arrangement according to the invention is simple to implement. It does not matter what type of network or bus, internal or external, is used to connect to the RAID subsystem 400. All that is needed is the block I/O path 121 with whatever hardware and software layers that are used to implement it. After the configuration application 410 has determined the configuration ID 402, it can direct all configuration commands to the configuration array 401 via the block I/O path 121, and not via a separate specialized configuration path as in the prior art.

User Block I/O Command Execution and Processing

Block I/O user data access commands typically include write and read commands for specific blocks within the user arrays 102. When a write command is processed, the only information that is sent back to the user application 111 is a status that indicates whether the command was processed successfully, or not. A read command will also provide user data. In prior art RAID arrays 102, all commands are processed completely independent of each other. That is, the processing of a read command is done without any knowledge of a prior write command, for example. This makes the implementation of the configuration array 401 using only write and read commands non-obvious.

Configuration Write Command Execution

Figure 5:
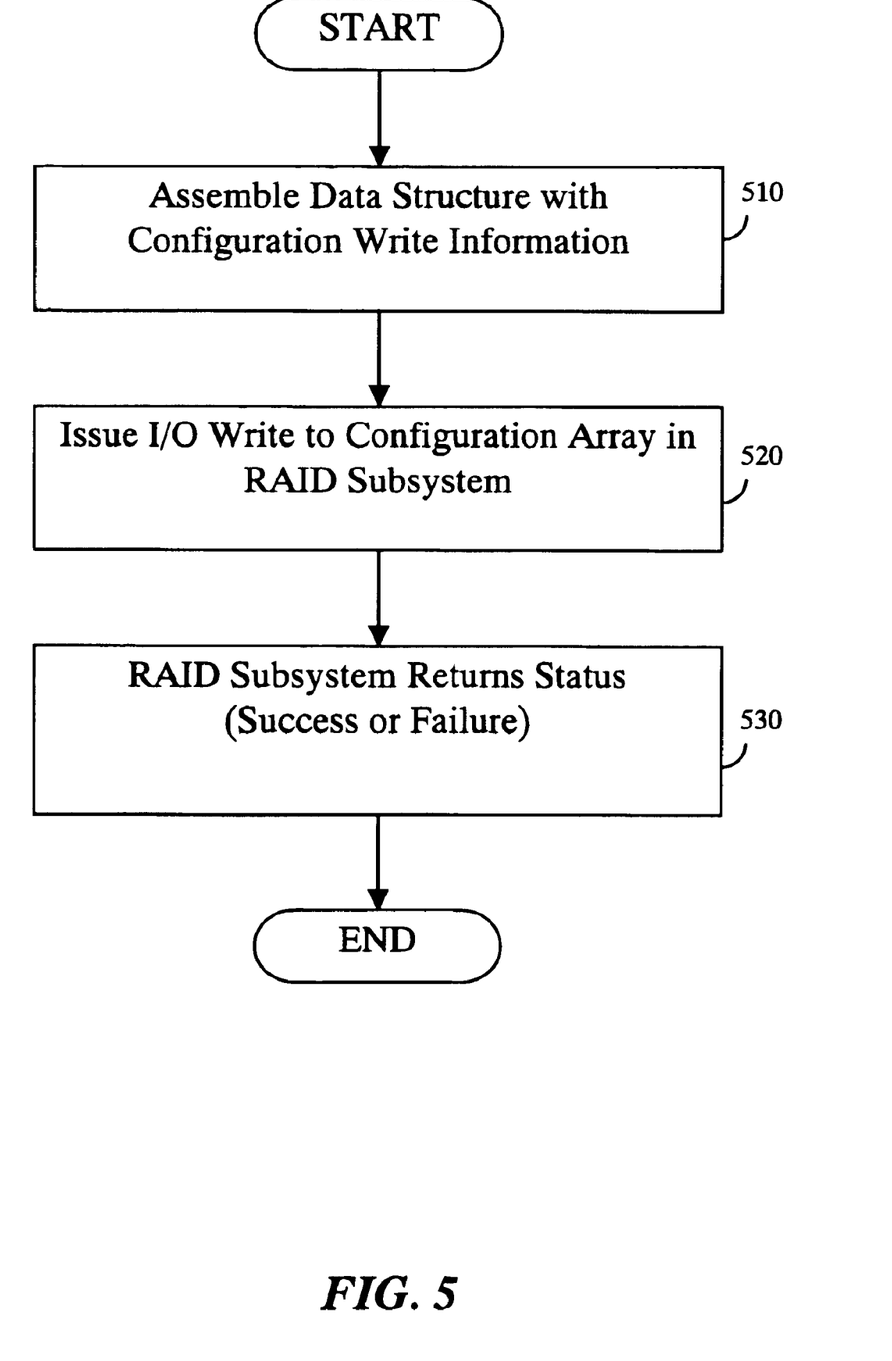
FIG. 5 is a flow diagram of the steps performed by the configuration application to execute write commands to the configuration array of FIG. 4.

FIG. 5 shows the steps of configuration write command execution according to the invention. In this case, a configuration write command is assembled 510 by the configuration application 410. Then, the configuration application 410 writes to a "block" 520 of the RAID subsystem 400 using the block I/O path 121 and the configuration ID 402. The word "block" is used loosely here to emphasize that the configuration array 401 appears like any other array to the configuration application, although, in fact, it implements configuration functions of a configuration module. After processing the write command, the RAID subsystem uses a universally available block I/O status mechanism to return success or failure 530 to the configuration application 410.

Configuration Read Command Execution

Figure 6:
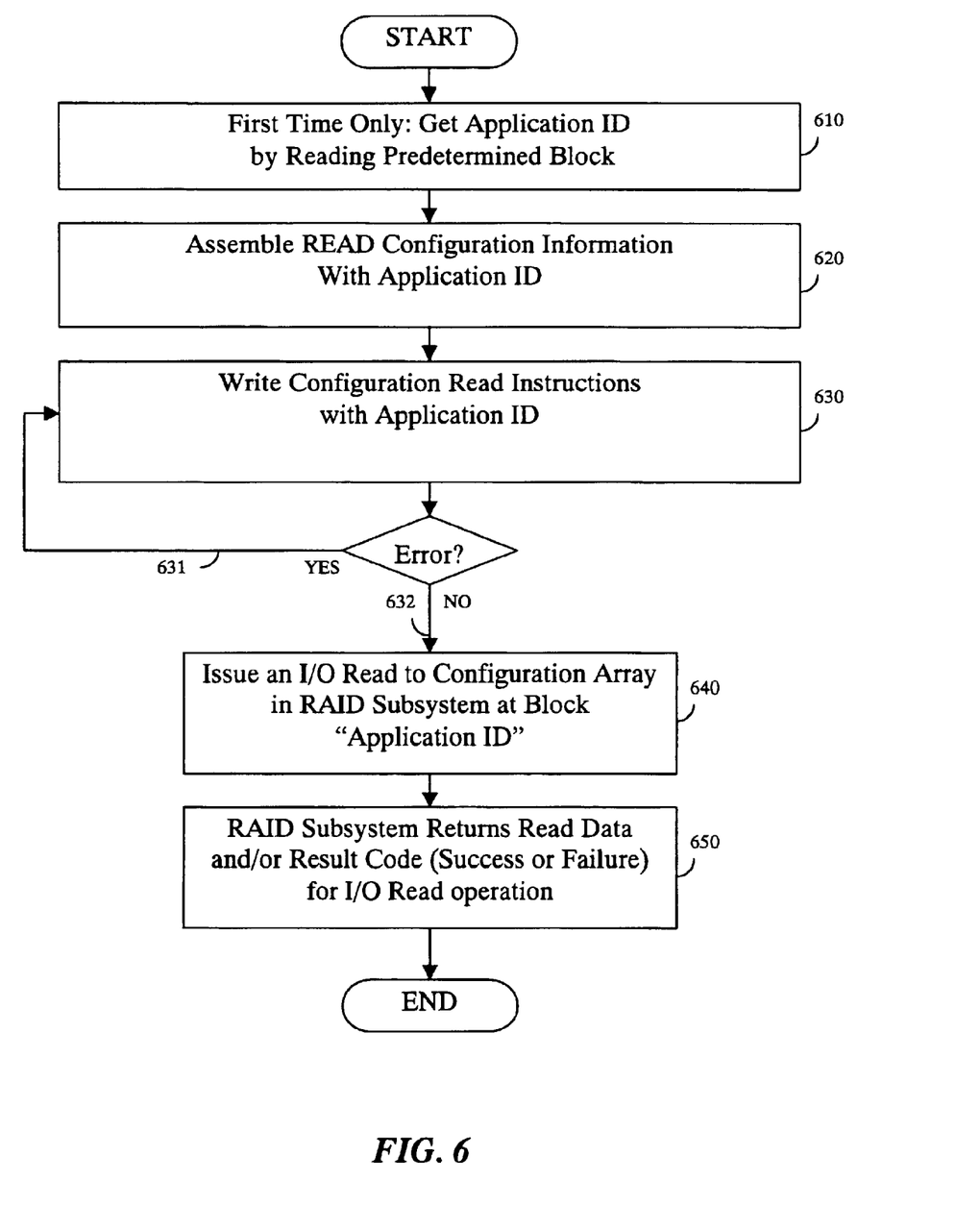
FIG. 6 is a flow diagram of the steps performed by the configuration application to execute read commands to the configuration array of FIG. 4.

FIG. 6 shows the steps of configuration read command execution according to the invention. In this case, the configuration application 410 requests to receive information pertaining to the status or structure of the RAID subsystem 400.

To execute a configuration read command, the configuration application first obtains an application ID. The application ID is used by the configuration array 401 to track commands executed by a specific configuration application should multiple configuration applications be executing concurrently.

Therefore, the configuration application reads a predetermined "block" 610 of the configuration array 401, e.g., block 0. When the configuration array 401 processes a read command for this block, it returns a unique application ID for the current configuration application 410. From that time on, the configuration array 401 can track commands executed by that specific configuration application with the associated application identification.

For subsequent read commands, the configuration application 410 assembles 620 a request to read a configuration information data structure that will convey to the RAID subsystem the specific configuration information that is requested. The configuration application then writes 630 that request to the configuration array by actually executing a block I/O write for the block with the application ID. If the return status is error 631, the command is reissued.

Otherwise, if the write command completes successfully 632, the configuration application next issues a block I/O read 640 to the configuration array 401 to receive the requested information from the RAID subsystem by reading the "block" in the configuration array 401 with the number that is equal to the application ID.

The configuration array then uses the application ID to identify the requested configuration information and returns the information with appropriate status 650 to the requesting configuration application.

RAID Subsystem Configuration Array Implementation

The RAID subsystem 400 receives block I/O write and read commands for the configuration array 401 via the block I/O path 121. The configuration array processes the commands to create or delete arrays in the RAID subsystem. The configuration array can also perform all other necessary functions to manage the RAID subsystem, such as, on-line expansion, RAID level migration, and assigning spare space. A configuration description of the arrays is also readable, and configuration applications can monitor the performance of the user arrays during operation.

Processing Configuration Write Commands

Figure 7:
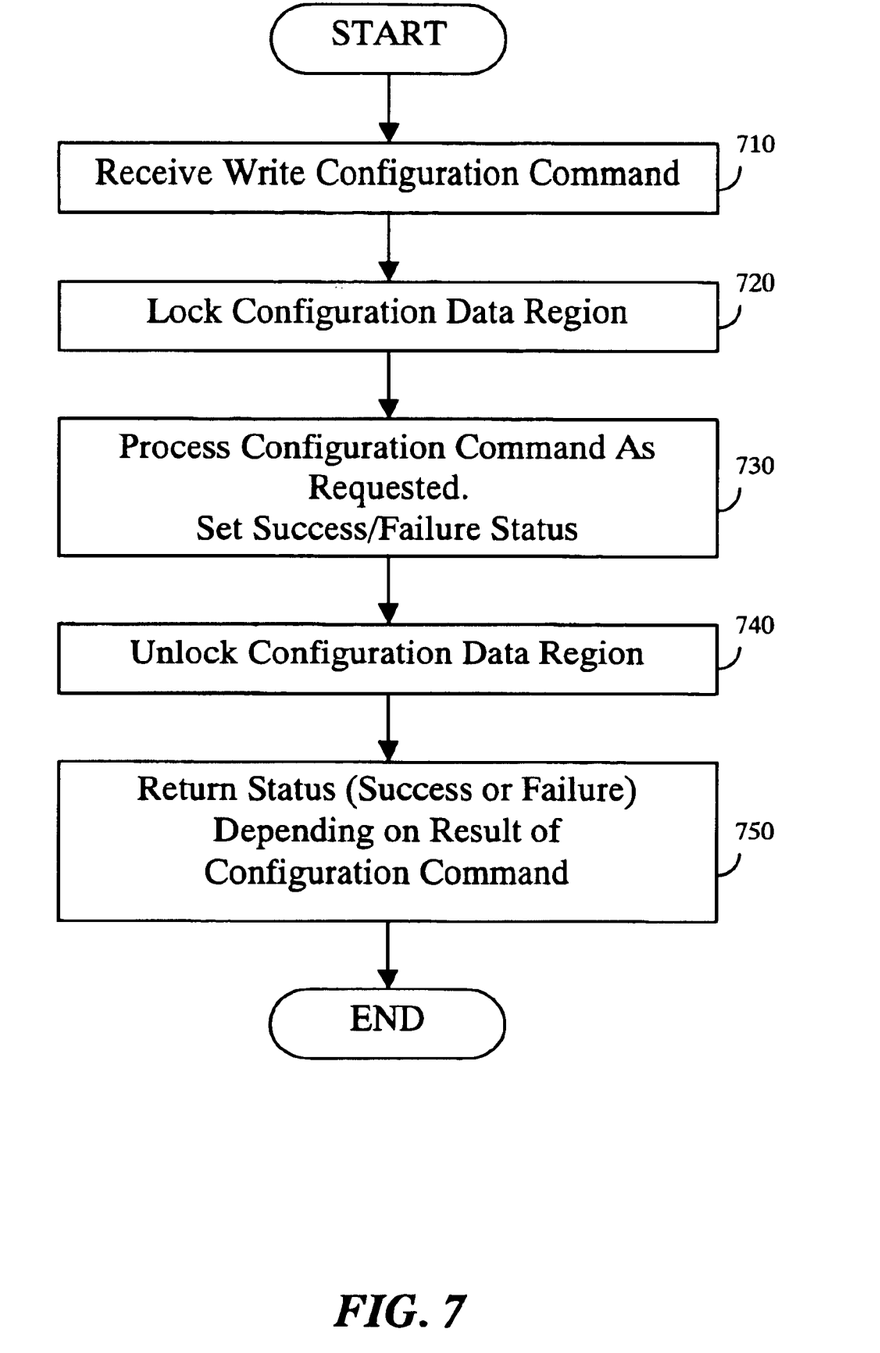
FIG. 7 is a flow diagram of the steps performed by the RAID subsystem to process configuration write commands according to the invention.

FIG. 7 shows the steps for processing configuration write commands according to the invention. After the configuration array receives a block I/O write command 710, associated internal data structures within the RAID subsystem are locked 720. Typically, these data are locked to prevent multiple configuration applications modifying the same data at the same time, and also to prevent user access to portions of the user data arrays while reconfiguration is performed.

The configuration write command is then processed 730 and the appropriate status is set. For example, a new array is created, or an old array is deleted. Then, the data structures are unlocked 740, and the status is returned 750 to the configuration application.

Processing Configuration Read Commands

Figure 8:
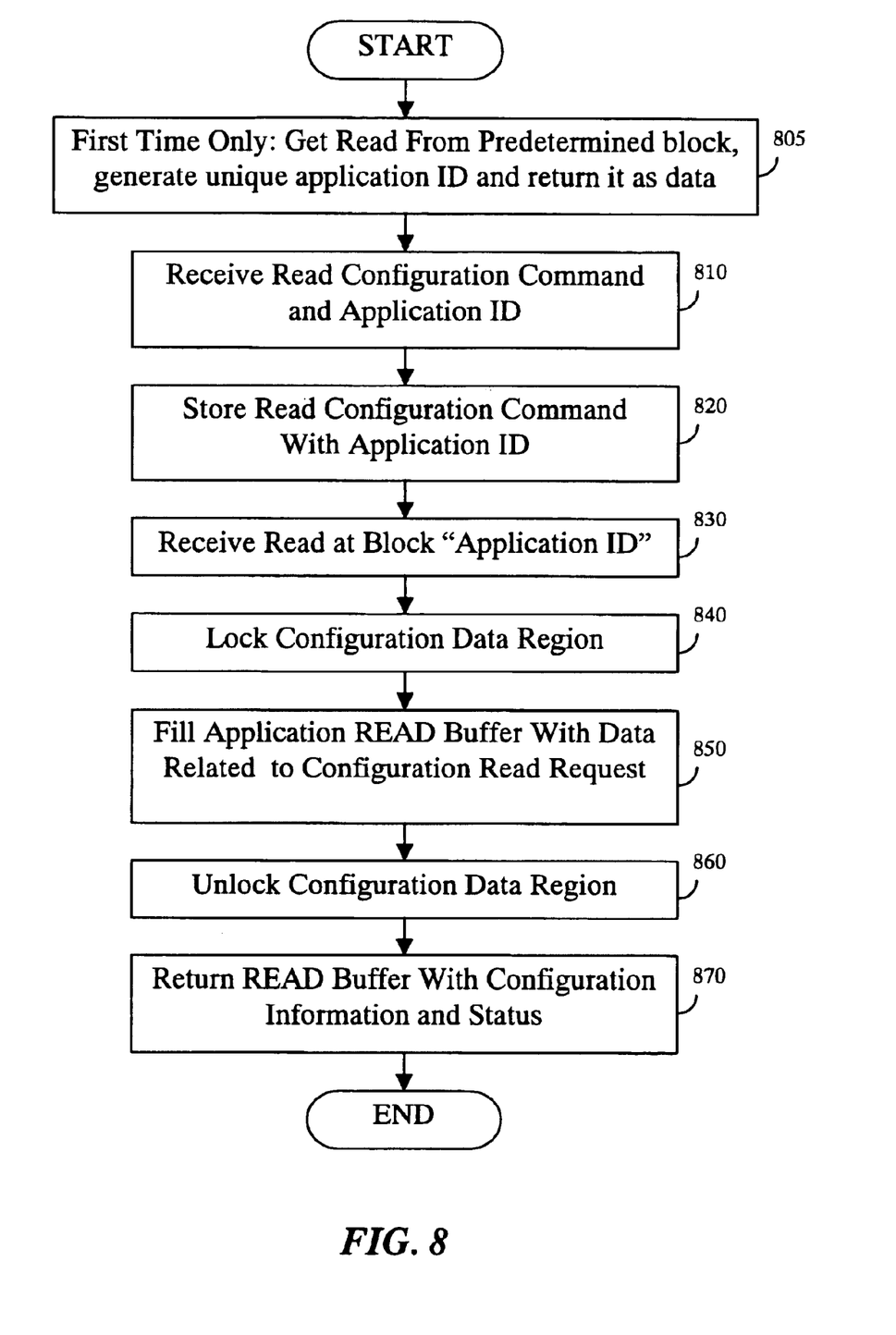
FIG. 8 is a flow diagram of the steps performed by the RAID subsystem to process configuration read commands according to the invention.

FIG. 8 shows the steps for processing configuration read commands. For the first use of each application, the application must acquire an application ID. The configuration device, will, therefore get a read once 805 from any new application to the predetermined block that returns application IDs. That read will cause a new ID to be generated and returned to the application.

Next, a configuration read command with a read configuration information data structure is received 810 by a block I/O write the configuration array. This means that the configuration application will subsequently also execute a deferred read command. The specific read command, which includes the application ID, is then stored 820 within the RAID subsystem.

When the subsequent block I/O read is received 830 by the configuration array, the block number, i.e., application ID, is compared with any number of pending read command/application ID pairs that were stored. When a match pair is found, the appropriate data structures within the RAID subsystem are locked 840, and the requested data are filled 850 into the application read buffer. After the read buffer is filled, the RAID subsystem data structures are unlocked 860, and the read information is returned 870 to the configuration application along with a return status.

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

We claim:

1. A configurable Redundant Array of Independent Disks (RAID) subsystem, comprising:
   a user data array accessible to a user application via a block input/output (I/O) path, the block I/O path comprising one or more programs configured to interface the user data array to the user application; and
   a configuration array accessible to a configuration application via the same block I/O path.

2. The configurable RAID subsystem of claim 1 wherein the user data array processes user data access commands executed by the user application, and the configuration application processes configuration commands, the user data access commands and the configuration commands communicated to the user data array and the configuration array respectively via the block I/O path.

3. The configurable RAID subsystem of claim 1 further comprising:
   block storage devices to physically store user data of the user data array.

4. The configurable RAID subsystem of claim 1 wherein the user data array includes a dynamic identification assigned by the configuration array, and the configuration array includes a static configuration identification.

5. The configurable RAID subsystem of claim 1 further comprising:
   means for assembling and executing a configuration write command in the configuration application;
   means for processing the configuration write command in the configuration array; and
   means for returning status on the processing of the configuration write command to the configuration application via the block I/O path.

6. The configurable RAID subsystem of claim 1 wherein the configuration application reads a predetermined block of the configuration array to obtain an associated application identification.

7. The configurable RAID subsystem of claim 6 further comprising:
   means for assembling and executing a configuration write command in the configuration application, the configuration write command including a request to read a configuration information data structure and the application identification;
   means for processing the configuration write command in the configuration array;
   means for assembling and executing a configuration read command in the configuration application, the configuration read command including the application identification;

means for processing the configuration read command in the configuration array; and means for returning the requested configuration information data structure and status to the configuration application.

8. A method for configuring a Redundant Array of Independent Disks (RAID) subsystem, comprising:

processing user data access commands executed by a user application in a user data array of the RAID subsystem accessible to the user application by a block input/output I/O path, the block I/O path comprising one or more programs configured to interface the user data array to the user application; and processing configuration commands executed by a configuration application in a configuration array of the RAID subsystem accessible to the configuration application via the block I/O path.

9. The method of claim 8 further comprising:

storing user data of the user data array on block storage devices.

10. The method of claim 8 further comprising:

assigning a dynamic identification to the user data array by the configuration array; and assigning a static identification to the configuration array.

11. The method of claim 8 further comprising:

assembling and executing a configuration write command in the configuration application;

processing the configuration write command in the configuration array; and returning status on the processing of the configuration write command to the configuration application.

12. The method of claim 8 further comprising:

reading a predetermined block of the configuration array by the configuration application to obtain an associated application identification.

13. The method of claim 8 further comprising:

assembling and executing a configuration write command in the configuration application, the configuration write command including a request to read a configuration information data structure and the application identification;

processing the configuration write command in the configuration array;

assembling and executing a configuration read command in the configuration application, the configuration read command including the application identification;

processing the configuration read command in the configuration array; and returning the requested configuration information data structure and status to the configuration application.

14. The method of claim 8 further comprising:

receiving a configuration write commands in the configuration array;

locking associated internal data structures of the RAID subsystem;

processing the configuration write command;

unlocking associated internal data structures of the RAID subsystem; and returning status to the configuration application upon completion of the processing.

15. A configurable a Redundant Array of Independent Disks (RAID) subsystem, comprising:

a user data array for processing user data access commands executed by a user application;

a configuration array for processing configuration commands executed by a configuration application; and a single block input/output I/O path, the block I/O path comprising one or more programs configured to interface the user data array to the user application and the configuration array to the configuration application.

16. The configurable RAID subsystem of claim 15 wherein the user data array includes a dynamic identification assigned by the configuration array, and the configuration array includes a static configuration identification.

17. The configurable RAID subsystem of claim 15 further comprising:

a plurality of user data arrays each having an associated dynamic identification assigned by the configuration array; and a plurality of configuration applications each having an associated application identification assigned by the configuration array.

18. The configurable RAID subsystem of claim 15 wherein the user application and configuration application execute only block I/O write and read commands to access the user data array and the configuration array via the block I/O path.

* * * * *